April 17, 1945. R. ANDERSON 2,373,802
SURGICAL CAST, CAST MATERIAL, AND METHOD
Original Filed Jan. 24, 1940 — 2 Sheets-Sheet 1

INVENTOR.
Roger Anderson
BY Arnold + Mathis
ATTORNEYS

INVENTOR.
Roger Anderson
BY
Arnold & Mathis
ATTORNEYS

Patented Apr. 17, 1945

2,373,802

UNITED STATES PATENT OFFICE 2,373,802

SURGICAL CAST, CAST MATERIAL, AND METHOD

Roger Anderson, Seattle, Wash.

Original application January 24, 1940, Serial No. 315,390. Divided and this application July 6, 1942, Serial No. 449,890

27 Claims. (Cl. 128—90)

This invention relates to a structural supporting-covering means formed from a plurality of members having a multiplicity of contacting portions and means adhering the members together at such contacting portions. This invention also contemplates a material ready for application comprising a multiplicity of flexibly joined together plastic members forming a strip permitting contacting members to be adhered together at their contacting portions. This application is a division of my co-pending application Serial Number 315,390, filed January 24, 1940, and now Patent No. 2,308,483.

More particularly this invention relates to a truss-like supporting member particularly applicable to the surgical and medical field for use as a cast. In describing this invention in connection with this field of utility, it is to be understood that the invention is not limited to such field but is coextensive to all fields where like problems exist in whole or in part.

This invention includes a method of preparing a device, such as a cast member; a prepared material ready for application, such as a cast material; and the completed device, such as the completed cast.

Medical and surgical casts primarily have for their purpose (a) fixation and (b) to sustain traction or pull and counter-traction or counter-pull. For example, where a bone has been fractured, it is necessary that the broken parts be held in the desired position to permit healing. A cast is placed over the flesh about the bone and indirectly holds the bones in the desired position—indirect in that the cast must act through the flesh in providing the desired position of the bone.

A primary object of this invention is to provide a cast material which may be applied to follow uniformly the variations in the flesh so that the cast will conform to the body. This is particularly necessary, for if the pressure is not uniformly distributed over a substantial area, soreness in particular spots will result, or if the pressure is so great as to close off blood vessels, then gangrenous conditions will result. Local pressure sores or gangrenous conditions resulting from pressure are not at all uncommon in casts heretofore used. Heretofore plaster of Paris casts were the type of casts generally employed in maintaining reduced or set fractures. While these plaster of Paris casts were of different forms, they generally comprised thin layers of gauze or the like disposed between layers of plaster of Paris.

In orthopedic surgery, generally it is necessary to place the patient under an anaesthetic during the time of the bone operation or fracture reduction, to apply the cast and then to keep the patient under the anaesthetic until the cast has sufficiently set to prevent displacement of the fracture.

While it has been long known that there are many shortcomings in the commonly used plaster of Paris casts, still no one has heretofore devised a cast which has been satisfactory and will overcome these recognized shortcomings.

It is an object of my invention to provide a cast member which will set and dry rapidly and thus reduce the relatively long anaesthetic period heretofore required where the standard plaster of Paris casts were used. While plaster of Paris cast-forming material may be obtained having longer and shorter setting periods, this does not solve the problem. The setting period of the plaster of Paris employed must be determined by the size of the cast. One layer after another of the plaster of Paris is applied and there should be no setting of the first layers until the latter layers are applied. In view of the fact that a chemical change takes place with the setting of plaster of Paris, the application of a second layer over a previously set layer would cause a weakening of the first set layer. Furthermore, if the first layer were set before the second layer were applied, there would be little, if any, adhesion between the two layers. Where a spica cast is applied, that is, about the body and one limb, or a double spica cast, that is, about the body and two limbs, a very substantial and thick cast structure is provided. To apply a spica or double spica plaster of Paris cast will obviously require considerable periods of time, and if a proper cast of sufficient strength is to be provided, obviously a slow-setting cast material must be employed or else the various layers of the cast will not be properly adhered together in a unitary cast structure. The use of a cast material, having a setting period so that the first bandages have not set before the later ones have been applied, obviously means that a long period of time must result after the cast has been applied before the same is set. Under such circumstances a relatively long anaesthetic period is required even though it is readily conceded that long anaesthetic periods have very undesirable effects on patients.

It is an object of my invention to provide a cast which is very transparent to the rays from X-ray and fluoroscope devices so that the condition of the fracture may be ascertained at all times. The plaster of Paris casts heretofore used are relatively dense to the rays of an X-ray or fluoroscope device and more dense when wet so that the attending physician could not positively ascertain conditions existing around a fracture.

If the attending orthopedic surgeon is able to use a fluoroscope at the time of reducing the fracture and applying the cast, very substantial increase in the precision of the operation is effected. In this connection it must be remembered that some portions of the body, as the hips, are normally considerably dense to the rays of a fluoroscope and any increase in this density, such as by wet plaster of Paris, will eliminate the possibility of use of the fluoroscope in fracture cases involving such dense parts of the anatomy.

It is a further object of my invention to provide a cast which is transparent or of an open mesh-like structure so that the attending physician will be able to ascertain existing skin conditions under the cast. Where an ordinary plaster of Paris cast is used, the attending physician is unable to ascertain the condition of the skin and is therefore not warned that gangrenous conditions by reason of pressure are impending. Obviously, all of the complaints of patients cannot be properly evaluated, as the normal reactions following an injury are not uniform. On the other hand, if the attending physician examines the skin as to color, etc., he will be in a position to more accurately diagnose existing conditions and to evaluate the complaints of patients.

It is an object of my invention to provide a cast member which may be reconstructed or repaired as conditions require so that it will be form fitting throughout the life of its use. After a cast is applied, it is common, especially when a cast is applied shortly after an injury, for swelling to occur to the injured member. Thus where a fresh fracture is involved it is frequently advisable to split the cast lengthwise so as not to cause undue pressure as the tissues around the fracture swell. Of course if the pressure were not relieved by splitting the cast, there is always the likelihood of subsequent gangrenous conditions. Also after the swelling normally inhering in a fresh fracture has been reduced, there is a further shrinkage due to the fact that the cast causes the flesh to be immobile and results in muscle atrophy and shrinkage of the soft tissues. Thus a cast which properly fits at the time of application often becomes too big because of muscle atrophy and shrinkage.

The unit cast structure of the plaster of Paris cast is of importance in determining the strength of the cast. If it is necessary to split a plaster of Paris cast to obtain a proper fit, the strength of the cast is materially decreased by reason of the splitting. At the present time bulky reinforcements are employed in an effort to avoid the weaknesses caused by splitting of the cast. However such bulky reinforcements generally do not accomplish the purpose of providing the original strength.

It is desirable that a cast be form-fitting throughout the life of its use even though the member under the cast may change size considerably due to swelling or reduction of swelling. With plaster of Paris casts a chemical action takes place with the setting thereof, and subsequent wetting of the cast does not serve to soften the cast so that it may be rehardened, but serves to crumble or wash away the set material. It has thus been long recognized that plaster of Paris casts have an inherent disadvantage so far as form-fitting throughout the life of their use, and this has been a matter of great concern to the attending physician.

It is an object of my invention to provide a cast formed from a plastic material which material will provide a cast that is non-toxic. Further it is an object to provide a cast from a plastic material which is non-absorbent. Present plaster of Paris casts are absorbent and it is not uncommon, particularly with elderly persons, for casts to become exceedingly contaminated by body eliminations or body sweat with resulting odors.

It is an object of my invention to provide a cast made from plastic material which may be re-used and therefore has scrap value.

It is an object of this invention to provide a cast member which may be applied in the surgeon's office or other place where convenient. In the prior art plaster of Paris casts, due to the powdery conditions of the loose plaster of Paris and the extremely untidy operation involved in applying a plaster of Paris cast, the use of such casts in offices or other places away from an operating room has been extremely limited. In applying a plaster of Paris cast, the plaster of Paris bandages must be applied wet and drip out white material, so that a special room, as the operating room, is used and, in practical effect, the application often results in an appearance much like the plastering of a house.

It is an object of my invention to provide a cast which is characterized by being free from moisture at the time of application, thus eliminating the relatively long drying-out period following the setting period existing in plaster of Paris casts. After a plaster of Paris cast sets sufficiently so that it will secure the fracture in the desired position, still there are very substantial portions of water present which must be removed as by evaporation. With a body cast it takes from 24 to 48 hours, or even longer, for the moisture to dry out of the cast. It is not uncommon for many complications to follow because of such moisture and long drying out period where large casts, as body casts, spica or double spicas, are involved. These complications include pneumonia. With the evaporation of moisture from the cast a cooling or lowering of temperature may be expected. On the other hand, it is the accepted method of treatment to combat shock following a major operation to apply heat and any cooling is undesirable. Obviously, it is difficult to have applied heat reach the patient through the insulation of a wet heavy plaster of Paris cast.

It is an object of my invention to provide a cast member which will permit therapy, including hydrotherapy, treatments without adversely affecting the cast member. The skin continually grows and there is a sloughing off of old skin and a constant secretion by the body pores. When it is necessary to confine a patient within a plaster of Paris cast for a relatively long period, this secretion and sloughed-off skin accumulate, causing undesirable odors and irritation of the skin. Oftentimes it is necessary to provide electrical, light, chemical, or drug therapy to the skin. Such treatment is obviously impossible with present-way plaster of Paris casts and at times it is necessary to remove a cast merely to provide some of the above treatments and then to provide a new cast. Many times, while the therapy treatment may be essential to combat certain complications, still this may not be done without seriously hazarding the fracture by removing the cast.

It is, therefore, an object of this invention to provide a cast member which is unaffected by moisture, which moisture may be present by reason of hydrotherapy treatments, moisture from the air or moisture secretion from the patient. In this connection it is important to note that casts are used in many cases which are not fracture cases but for cases as sprains, swollen tender joints, arthritis, holding extremities, body or head, in corrected positions, club feet, and following certain plastic operations, such as for skin, tendons, nerves, blood vessels, muscles and joint conditions. In these cases it may be advisable to provide the patient with various types of therapy, water therapy in special exercise tanks, and baths.

It is an object of this invention to provide a cast which is characterized by having its full strength shortly after the cast is applied. In the prior art plaster of Paris casts, the casts were somewhat weak until the plaster of Paris had completely set and completely dried, the period of complete drying requiring often from twenty-four hours to forty-eight hours depending on the bulk of the cast. Many times plaster of Paris casts have been broken during the drying period in providing the routine care to patients as by nurses.

It is an object of this invention to provide a cast which is relatively light in weight. In the prior art plaster of Paris casts, double spica plaster of Paris casts often weight as much as twenty pounds, thus increasing the weight of the patient and enhancing the problem of the nurse in moving the patient as well as enhancing the problem of the patient moving where otherwise able. In this connection I provide a cast which will weigh one-third or less than the weight generally necessary in plaster of Paris casts.

It is an object of my invention to provide a cast-forming material, which cast-forming material may be provided in strips or sheets comprised of a plurality of contacting pieces so that the strips may be applied in contacting relation about an injured member or part and then the pieces adhered together at their contacting portions.

It is an object of my invention to provide a cast which will be closely conforming and comfortable feeling to the patient, and neat appearing.

It is an object of my invention to provide a cast which has a certain degree of resiliency to the end of eliminating the fracturing and chipping heretofore resulting when plaster of Paris casts were in use.

It is an object of my invention to provide a cast which may be readily and rapidly cut so as to permit the same to conform to the body to eliminate pressure sores and at the same time to permit the cast to be immediately and rapidly repaired without loss of strength. In this connection I provide a cast where there is proper annealing, fusing or cementing action between the cast and any additional cast material of like nature which may be applied thereto.

It is a further object of my invention to provide a cast material which may be applied with more latitude allowed in technique. Contrary to prevailing opinion, it takes considerable skill and experience to properly apply a plaster of Paris cast. The bandage containing the plaster of Paris must be lapped around many times and the base of this plaster of Paris bandage is ordinary cotton bandage which has a tendency to fold and cause creases unless properly applied. Creases, if present, generally cause local skin sores, undue pressure, complications and pain. It is an object of my invention to provide a cast-forming material which may be applied with the exercise of less skill or more latitude in technique and at the same time to provide a closely conforming well-fitting cast.

It is an object of my invention to provide a cast which may be easily and readily removed when desired. In the prior art many casts have a thickness up to an inch and a half, which thickness is provided by a number of layers of cloth and a number of layers of hardened or set plaster of Paris. It is obviously a very difficult task to remove such a cast. Generally the cast is cut away by knives and it is really a task for a chisel and a hammer. On the other hand, I provide a cast which may be chemically softened or cut away by an ordinary pair of shears.

It is an object of my invention to provide in dry form a plurality of pieces of material which will form a truss-like structure, with the pieces and portions of a piece in contacting relation so that they may be adhered, cemented or welded together to form a unit cast structure. It is a further object of my invention to form a mesh-like structure so that visibility and accessibility to the skin of the patient is not eliminated by the presence of the cast structure. It is a further object of my invention to provide a cast-forming material in a form so that there is no deterioration of the same by exposure to air or weather prior to use. This provides for utmost economy in that the portion of the material desired for use may be removed from a sterile container and the remainder saved for subsequent use.

It is an object of my invention to provide a cast-forming material which is particularly useful where extension types of casts are to be used. In an extension type of cast, two separate casts are formed with a space therebetween, then the proper extension is made and a cast is provided between the two separate members. The prior art plaster of Paris casts required an extremely bulky cast to obtain the desired strength in such type of casts. As distinguished therefrom, my invention provides an extension type of cast with little difficulty and no more bulk than the ordinary cast of my invention.

*Materials*

Many materials may be used in this invention and preferably cellulose plastics are used, as:

Cellulose acetate
Cellulose nitrate

Use may also be made of:

Vinyl resins
Celluloid, and
Similar substances.

Also the plastic material may be transparent or suitably colored if desired.

*Adhesives or liquids to be used in adhering, welding or securing the pieces of material together*

Typical liquids which bring the desired action are:

| | |
|---|---|
| Acetone | Benzyl "Cellosolve" |
| sec-Butyl alcohol | Acetylene dichloride |
| Carbon disulfide | n-Butylamine |
| Ethyl alcohol | Ethyl acetate |
| Methyl acetone | Methyl acetate |
| n-Amyl acetate | Methyl ethyl ketone |
| m-Amyl alcohol | Amyl acetate (mixed isomers) |
| "Cellosolve" acetate | "Cellosolve" |
| Diethyl "Cellosolve" | Methyl amyl acetate |
| Isobutyl acetate | Methyl "Cellosolve" acetate |
| "Carbitol" acetate | |

"Carbitol" and "Cellosolve" are trade designations but not proprietary trade-marks of products extensively used and known in industry. The said names are defined in standard chemical dictionaries. They are probably best defined as "Carbitol" meaning diethyleneglycol ethylether and as "Cellosolve" meaning ethylene glycol mono-ethyl ether.

*Forms*

The materials may be employed in the form of solids, coated inert solids, or hollow structures.

*Structures*

Typical structures which may be employed are illustrated in the following drawings, the same being preferred exemplary forms of structures for use in this invention, throughout which drawings like reference numerals indicate like parts:

Fig. 19 is a view similar to Fig. 15 except the pieces are shown as thread-like;

Fig. 42 is a plan view of a structure showing a plurality of plates interconnected by rod or thread members forming a link belt-like structure;

Fig. 43 is a sectional view taken substantially on broken line 43—43 of Fig. 42;

Fig. 44 is a view similar to Fig. 42 except that link members have been substituted for the plate members;

Fig. 45 is a sectional view taken substantially on broken line 45—45 of Fig. 44;

Fig. 50 is a fragmentary view partly in section and partly in elevation showing a structure comprising block-like members with a superposed sheet of material;

Fig. 52 is a view taken substantially on line 52—52 of Fig. 51;

Fig. 53 is a fragmentary sectional view showing a structure formed of a plurality of ribbon-like members; and Fig. 54 is a view taken substantially on line 54—54 of Fig. 53.

Figure 1:
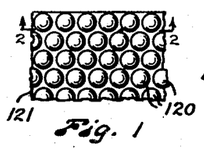
Figure 1 is a fragmentary plan view of a form of structure showing sphere-shaped pieces secured to a carrier means, as wool, cotton or rayon fabric or a piece of paper.
Figure 2:
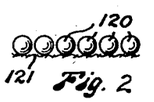
Fig. 2 is a view partly in elevation and partly in section substantially on broken line 2—2 of Fig. 1.
Figure 3:
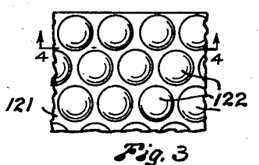
Fig. 3 is a view similar to Fig. 1 except the pieces are shown as half spheres and their bases are secured to the carrier means.
Figure 4:
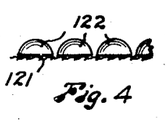
Fig. 4 is a view similar to Fig. 2 taken on 4—4 of Fig. 3.
Figure 5:
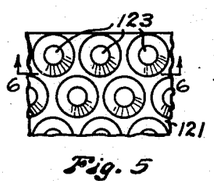
Fig. 5 is a view similar to Fig. 1 except the pieces are shown as tapering members, such as truncated cones and their bases are secured to carrier means.
Figure 6:
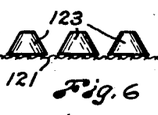
Fig. 6 is a view similar to Fig. 2 taken on 6—6 of Fig. 5.
Figure 7:
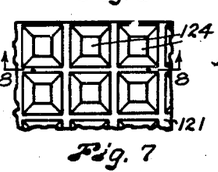
Fig. 7 is a view similar to Fig. 1 except the pieces are shown as tapered members, such as truncated pyramids with their bases secured to carrier means.
Figure 8:
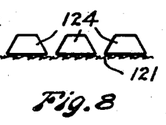
Fig. 8 is a view similar to Fig. 2 taken on 8—8 of Fig. 7.
Figure 9:
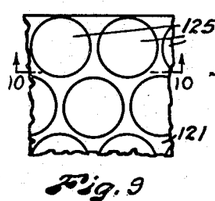
Fig. 9 is a view similar to Fig. 1 except the pieces are shown as disc-like members.
Figure 10:
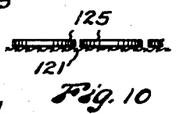
Fig. 10 is a view similar to Fig. 2 taken on 10—10 of Fig. 9.
Figure 11:
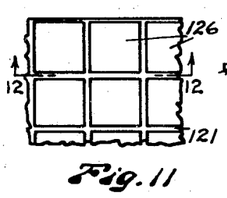
Fig. 11 is a view similar to Fig. 1 except the pieces are shown as rectangular solids.
Figure 12:
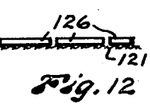
Fig. 12 is a view similar to Fig. 2 taken on 12—12 of Fig. 11.
Figure 13:
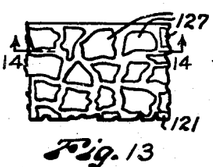
Fig. 13 is a view similar to Fig. 1 except the pieces are shown as having irregular shapes.
Figure 14:
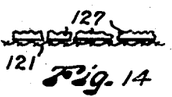
Fig. 14 is a view similar to Fig. 2 taken on 14—14 of Fig. 13.

In Figs. 1 and 2, I have shown a plurality of spheres 120 which are secured to a carrier means 121 which may be wool, cotton, rayon, plastic or glass fabric or a piece of paper—as crepe paper. In Figs. 3 and 4 I have shown half spheres 122 secured to a carrier means 121. In Figs. 5 and 6, I have shown truncated cones 123 secured to carrier means 121. In Figs. 7 and 8, I have shown truncated pyramids 124 which are secured to carrier means 121. In Figs. 9 and 10, I have shown disc-like members 125 which are secured to carrier means 121. Figs. 11 and 12 show rectangular-shaped pieces 126 secured to carrier means 121, and Figs. 13 and 14 show irregular-shaped pieces 127 secured to carrier means 121.

The various shaped pieces shown in Figs. 1 to 20 inclusive, may be solids or they may be hollow or they may be provided by coating an inert material. As an illustration thereof, I have shown in Figs. 25 and 26 hollow half spheres 128 and in Figs. 27 and 28 inert material 129 with a coating 130 thereon. The inert material 129 is inert so far as the material used for the particles and the adhesive used is concerned.

Figure 15:
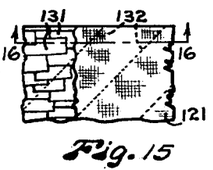
Fig. 15 is a fragmentary plan view of another form of structure with the top carrier means partially broken away showing a plurality of irregular-shaped pieces between two carrier means and with stitching provided to secure the irregular-shaped members between the carrier means.
Figure 16:
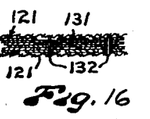
Fig. 16 is a sectional view taken substantially on broken line 16—16 of Fig. 15.
Figure 17:
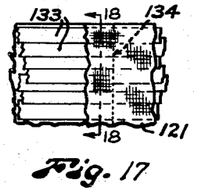
Fig. 17 is a view similar to Fig. 15 showing a plurality of ribbon-like members between carrier means.
Figure 18:
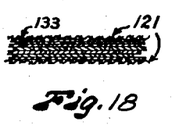
Fig. 18 is a view similar to Fig. 16 taken on 18—18 of Fig. 17.
Figure 19:
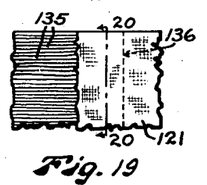
Figure 20:
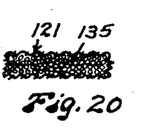
Fig. 20 is a view taken substantially on 20—20 of Fig. 19.

In Figs. 15 and 16 I have shown a plurality of irregular-shaped pieces 131 which are positioned between two carrier means 121 and provided with stitchings 132 so that the members will be held in position until the adhesive material is applied. In Figs. 17 and 18, I have shown a plurality of ribbon-like members 133 secured between two carrier means 121, and again a stitching 134 which is similar to the stitching 132. In Figs. 19 and 20 I have shown a plurality of thread-like members 135 secured between two carrier means 121 by stitchings 136.

In Figs. 15–20 I have shown two carrier means 121 with a plurality of various shaped pieces therebetween, and have utilized a stitching to hold the pieces in their initial position. This will provide a strip-like cast-forming material which may be conveniently applied and with the various pieces secured for convenient application. Thereafter the adhesive material is applied and the various pieces are secured together at their contacting portions.

Figures 21, 22, 23, 24, 25, 26, 27, 28:
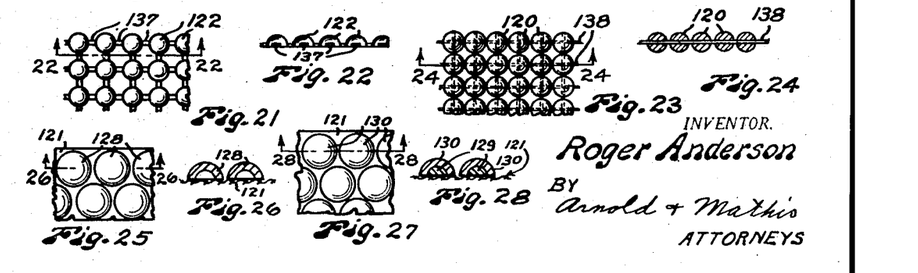
Fig. 21 is a fragmentary plan view of another form of structure where members, as the half spheres of Figs. 3 and 4, are molded with pieces of the material formed between the half spheres to serve as carrier means.
Fig. 22 is a view partly in elevation and partly in section taken substantially on broken line 22—22 of Fig. 21.
Fig. 23 is a view where members, as the spheres of Figs. 1 and 2, are secured together by a string-like member formed integral with the spheres at the time of molding.
Fig. 24 is a view similar to Fig. 22 taken on 24—24 of Fig. 23.
Fig. 25 is a fragmentary plan view of a structure similar to Figs. 3 and 4 except that the half spheres are hollow.
Fig. 26 is a view similar to Fig. 22 taken on 26—26 of Fig. 25.
Fig. 27 is a view similar to Fig. 25 except that the half spheres are formed by coating an inert material.
Fig. 28 is a view similar to Fig. 22 taken on 28—28 of Fig. 27.
Figures 29, 30, 31, 32, 33, 34, 35, 36, 37, 38:
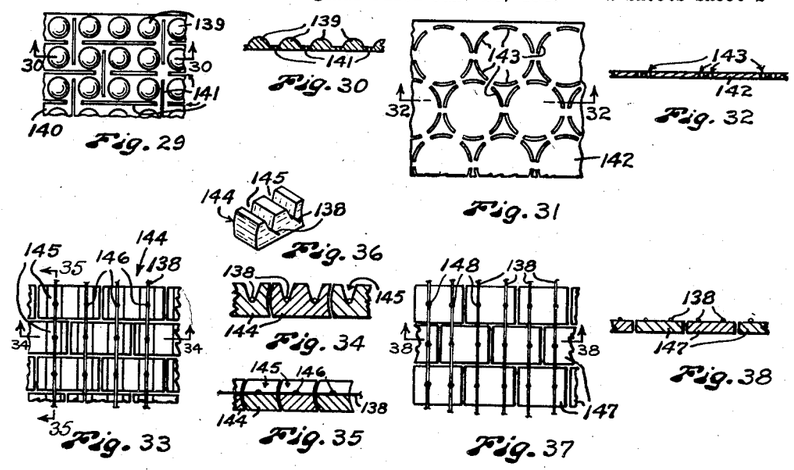
Fig. 29 is a view similar to Fig. 21 except that the half spheres are connected by a sheet of material which has been slotted.
Fig. 30 is a view similar to Fig. 22 taken substantially on 30—30 of Fig. 29.
Fig. 31 is a view similar to Fig. 21 except that the members and their connecting means are formed by slotting a continuous sheet of material.
Fig. 32 is a view similar to Fig. 22 taken on 32—32 of Fig. 31.
Fig. 33 is a fragmentary plan view of a structure where a plurality of staggered blocks are provided with recesses through which thread-like members pass and which thread-like members are secured to the blocks.
Fig. 34 is a sectional view taken substantially on 34—34 of Fig. 33.
Fig. 35 is a sectional view taken substantially on 35—35 of Fig. 33.
Fig. 36 is a perspective view of one of the blocks shown in Figs. 33—35.
Fig. 37 is a plan view of a structure showing a plurality of staggered blocks and thread-like members connecting the blocks together.
Fig. 38 is a sectional view substantially on 38—38 of Fig. 37.

In Figs. 21 and 22 I have shown a carrier means in the nature of thread-like members 137 which are formed from the material forming the members. For example, I have shown that the thread-like members 137 may be used in connection with the half spheres 122. In Figs. 23 and 24 I have shown a carrier means in the nature of a thread 138 which may be of cotton, wool, rayon, paper, or the like, and the members are molded over such thread-like member 138. While I have shown thread-like members in such figures, obviously a fabric may be employed. The shape of the member again may be any of the forms shown in Figs. 1–14, and as an example I have shown the spheres 120. In Fig. 29 I have shown a structure where the members as half spheres 139 are molded integral with a continuous sheet of the material 140 and where slots 141 are provided. The slots 141 provide the proper elasticity, so that the material will conform to the shape desired, as tapering or irregular. Also all carrier means disclosed herein are preferably somewhat elastic for the same purpose—such elasticity may obtain in carrier means, as 138 of Figs. 23–24 by the nature or structure of the material or the excess thereof between members, as between members 120. In Fig. 31, I have shown a continuous sheet of material 142 which is provided with slots 143 so that shapes as disc-like members are formed.

Figs. 21–24 and 29–32 thus provide an alternative carrier means where the members of various shapes may be molded over thread or fabric-like members of wool, cotton, rayon, glass, paper, or the like, or where the carrier may be formed of the material in the members themselves either as string-like members or as a continuous sheet with slots.

Figure 39:
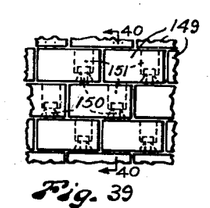
Fig. 39 is a plan view of a structure showing a plurality of interlocking blocks.
Figure 40:
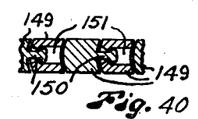
Fig. 40 is a sectional view taken substantially on broken line 40—40 of Fig. 39.
Figure 41:
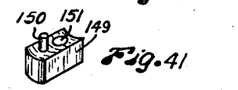
Fig. 41 is a perspective view of one of the blocks shown in Figs. 39 and 40.

In Figs. 33–36, I have shown a plurality of block-like members 144 provided with recesses 145 through which pass a plurality of threads as threads 138. The blocks are staggered as shown in Fig. 33 and each thread is secured to the block adhesively as at 146. In Figs. 37 and 38, I have shown a plurality of blocks 147 and threads 138 passing thereover, with the threads adhesively secured to the blocks as at 148. In Figs. 39–41, I have shown blocks 149 provided with pins 150 and recesses 151. A pin 150 of a block may be inserted into a recess 151 of another block and then the pin 150 flattened as by heat to provide a plurality of staggered and interlocked blocks 149.

In Figs. 33–41 I have thus shown a plurality of interconnected blocks which will form strips to be applied as described in connection with previous strips. I have further shown a plurality of ways in which the blocks may be initially secured to form strips which will thereafter be adhesively secured together at their contacting portions.

Figs. 42 and 43 disclose a structure in which a plurality of plates 152 of plastic material are positioned side by side and connected together by flexible rods or threads 138 and thus form a link belt-like structure.

Figs. 44 and 45 disclose links 153 formed of plastic material and connected together by flexible connecting members such as threads 138, The structures in Figs. 42–45 are somewhat similar to those of Figs. 33–41.

Figure 46:
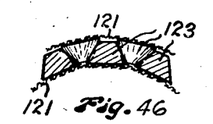
Fig. 46 is a fragmentary view partly in section and partly in elevation showing a structure formed of two layers of truncated cone members.

In the event of the use of the tapered members 123 of Figs. 5 and 6, or 124 of Figs. 7 and 8, pairs of layers will be wrapped to provide the cast so that the members will interfit to provide a structure shown in Fig. 46. This figure is a fragmentary view partly in section and partly in elevation where one strip formed of carrier 121 and truncated cones 123 is placed over the injured member with the carrier 121 adjacent thereto and a paired layer is placed over the first layer with the truncated cones 123 inwardly and the carrier 121 outwardly. After a pair of layers has been thus provided, an adhesive is sprayed to adhere the contacting portions of the members 123 together.

Figure 47:
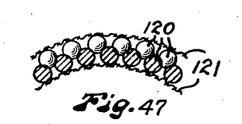
Fig. 47 is a fragmentary view partly in section and partly in elevation showing a structure formed of two layers of sphere members.

In the event of the use of the spheres 120 of Figs. 1 and 2, pairs of layers will be wrapped to provide the cast so that the members will interfit to provide a structure shown in Fig. 47. This figure is a fragmentary view partly in section and partly in elevation where one strip formed of a carrier 121 and spheres 120 is placed over the injured member with the carrier 121 adjacent thereto and a paired layer is placed over the first layer with the spheres 120 inwardly and the carrier 121 outwardly. After a pair of layers has been thus provided, an adhesive is sprayed to adhere the contacting portions of the members 120 together.

Figure 48:
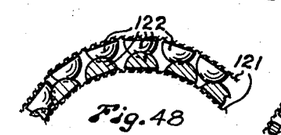
Fig. 48 is a fragmentary view partly in section and partly in elevation showing a structure formed of two layers of half-sphere members.

In the event of the use of the half spheres 122 of Figs. 3 and 4 or the similar half spheres of Figs. 25 to 28 inclusive, pairs of layers will be wrapped to provide the cast so that the members will interfit to provide a structure shown in Fig. 48. This figure is a fragmentary view partly in section and partly in elevation where one strip formed of a carrier 121 and half spheres 122 is placed over the injured member with the carrier 121 adjacent thereto and a paired layer is placed over the first layer with the half spheres 122 inwardly and the carrier 121 outwardly. After a pair of layers has been thus provided, an adhesive is sprayed to adhere the contacting portions of the members 122 together.

Figure 49:
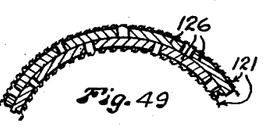
Fig. 49 is a fragmentary view partly in section and partly in elevation showing a structure formed of two layers of rectangular members.

In the event of the use of the disc-like members 125 of Figs. 9 and 10, or the rectangles 126 of Figs. 11 and 12, pairs of layers will be wrapped to provide the cast so that the members will overlap to provide the structure shown in Fig. 49. This figure is a fragmentary view partly in section and partly in elevation where one strip formed of a carrier 121 and rectangles 126 is placed over the injured member with the carrier 121 adjacent thereto and a paired layer is placed over the first layer with the rectangles 126 inwardly and the carrier 121 outwardly. The rectangles 126 may be sufficiently thin to bend and form the curve as shown in Fig. 49 or their shape may be originally arcuate in section. After a pair of layers has been thus provided, an adhesive is sprayed to adhere the contacting portions of the members 126 together.

The use of the other shaped members in Figs. 1–45 and their appearance is deemed obvious in view of the foregoing discussion in connection with Figs. 46–49, and for that reason I have not made further illustrations. However, it is to be understood that I may combine various shaped members and use one of one form and another of another form, so that the number of possible permutations is large. In illustration thereof, I have shown in Fig. 50 block-like members 154 mounted on a carrier means 121 and a sheet 155 having openings 156 therein. This figure is a fragmentary view in section showing the carrier means 121 adjacent the member over which a cast is formed and with the other parts exteriorly thereof. After the carrier 121 and block-like members 154 have been placed over the injured member with the block-like members 154 outwardly, a sheet of material 155 with openings 156 therein is wrapped in contacting relation with the blocks 154. Thereafter an adhesive is sprayed to adhere the sheet 155 to the blocks 154 at their contacting portions.

Figure 51:
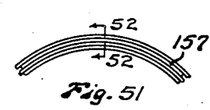
Fig. 51 is a fragmentary view in elevation showing a structure formed of a plurality of thread-like members.

In Figs. 51 and 52 I have shown another modified structure. Fig. 51 is a fragmentary view in elevation, and Fig. 52 is a view taken substantially on 52—52 of Fig. 51. Here a plurality of thread-like members 157 are wound about an injured member and the adhesive sprayed to secure the thread-like members together to form the cast.

In Figs. 53 and 54 I have shown another modified structure where ribbon-like members 158 are wound about an injured member to form a cast. Fig. 53 is a fragmentary sectional view and Fig. 54 is a view taken substantially on line 54—54 of Fig. 53. In this structure a plurality of ribbon-like members 158 are wound about an injured member and the adhesive is then sprayed on the members to adhere them together at their contacting portions and thus form a cast structure.

The particles or pieces employed in my invention may take various shapes or configurations as illustrated in the previously described drawings. The materials from which these members may be formed, as well as adhesives which may be employed, have also been described. The surface of the material used is preferably non-porous in character so that any excess adhesive used will be readily removed instead of tending to completely dissolve the material. It is important to note that I have provided flexibly joined pieces which are discrete geometric solids. Such term as herein employed, both in the specification and claims, defines the illustrated spheres, half spheres, truncated cones, truncated pyramids, discs, rectangles, irregular shaped pieces, blocks, links, etc., so that discrete, tangible, or corporal pieces are provided. Also such solids may be formed of a common material, they may be hollow, or they may be a coated inert material. Also it is important to note that I provide flexible joining means between the geometric solids so that flexibility obtains therefrom. The term flexible joining means providing flexibility between said solids as employed herein will include the carrier means 121 of various figures, the thread-like members 137, the thread 138, the flexible interlocking means, etc., so that flexibility obtains in the connecting means between discrete geometric solids. The various discrete pieces or geometric solids, due to their flexible joining means, are conformed about an injured member and with surface contact between adjacent pieces—this contact is shown in the various figures and such term is so employed herein. After providing such contact, the adherence of the solids together provides a rigid structure, wherein prevention of relative movement between the solids provides the rigidity.

In applying a cast in accordance with this invention, it may be advisable to first apply a cloth about the injured member. If it is found desirable to apply such a cloth, preferably a cloth formed of spun glass is used, as such cloth is inert to body perspiration. Either over such cloth or directly over the injured member, the pieces or particles of the material are applied to form a plurality of contacting members having numerous or a plurality of contacting areas. The strips comprising a plurality of pieces may be applied in a dry state and then sufficient adhesive spray applied. Excess adhesive will be readily removed and a quick-setting cast formed. In addition to spraying the adhesive, it may be applied as by dipping the particles or it may be applied by a brush.

Also, preferably, the particles are of a substantial cross-section area such as at least 1/32 of an inch. It seems that where relatively large particles are used excess adhesive will evaporate and/or migrate inwardly of the pieces or particles without dissolving the same, thus removing excess adhesive and permitting considerable latitude in the amount of adhesive which may be applied. This means that I have removed any necessity for the application of a critical amount of adhesive, which compensates for the individual variations in technique.

The fact that excess adhesive is removed by drainage and/or evaporation and/or by migration inwardly of the particles is important in this invention. For example, if a powdered material were mixed with an adhesive to form a dough-like mass, this dough-like mass would take a substantially long period of time to set.

If the pieces of the various shapes have been formed of a material such as a cellulose acetate, then a liquid such as acetone may be applied as by spraying. Due to the fact that the pieces have relatively substantial bodies, considerable latitude obtains in the amount of acetone which may be used. Of course if the acetone substantially dissolved the cellulose acetate, a very slow drying would result. However, I have found that by spraying the structure with acetone very little acetone need be employed, and due to the body of the material, the discrete structure, and the contacting relationship between such discrete pieces, excess, if any, acetone will be eliminated so that a rapid setting obtains. In the event of use of a rayon carrier, acetone will cause the carrier to become a part of the completed cast.

The contacting plastic members may be adhered together by adhesives which are applied by a brush or a spray. If applied by a spray, the liquid may be heated and applied as a heated vapor. Also a strip may be immersed or dipped in the liquid before application. In such cases, it may be advisable to apply a thus wetted layer adjacent one or between two dry layers. Also where relatively small pieces of plastic material are employed and the same are dipped before application, the excess liquid may be removed physically as by wringer means.

As an alternative means of adhering together at their contacting portions any of the various shaped plastic members previously described, the plastic members may be formed on or in contact with a metallic material or pieces thereof. For example, in Figs. 27 and 28, the pieces 130 may be formed with a metallic core 129. Thereafter the plastic material may be heated by said metallic member being placed in inductive relation to a primary field and a temperature in the plastic members attained which will cause the plastic members to become sufficiently fluid to cause adherence between the plastic members at their contacting portions.

A further alternative means of adhering together at their contacting portions any of the various shaped plastic members previously described may be accomplished by providing alternate members with a dried adhesive thereon, much like the adhesive on a postage stamp, and thereafter wetting the structure to cause adherence between pieces or particles at their contacting portions. In this connection I prefer to use "water-proof" animal glue or glue having similar water-proof characteristics. In such instances the particles or pieces forming the framework may be of any suitable plastic as previously described or plastics which will not be dissolved or softened by the adhesive, such as phenol condensates.

Also a framework may be provided about an injured member by the use of any of the previously described structures and thereafter tape means applied about such framework. In this instance the adhesive material may be carried by either the framework or the applied tape. In this respect I have found that Scotch tape or ordinary medical adhesive tape may be utilized.

Casts embodying my invention set with such phenomenal rapidity that the period of time which the patient must be kept under an anaesthetic will be greatly reduced over any type of cast heretofore known. Furthermore casts embodying my invention may be made to conform to the exterior surface of an injured member and such conformity may be maintained throughout the use of the cast. Also the under surface, or the surface contacting the skin, of my cast is such that movement of the skin relative to the cast is possible. This results from the fact that the cast does not provide a continuous contacting area but provides spaces between the contacting areas. By permitting movement of the skin relative to the cast very substantial medical values result. My invention thus provides a prepared material ready for application, as a cast material which may be sold to orthopedic surgeons in strip-form; my invention provides, also, the device which is made up from such prepared material, as the cast which is made up by applying the prepared material about an injured member; and my invention covers the method of applying the prepared material to form a device, such as a cast.

Obviously, changes may be made in the forms, dimensions and arrangements of the parts of my invention without departing from the principle thereof.

I claim:

1. The method of forming a surgical cast or splint from a strip composed of a multiplicity of discrete geometric solids of a plastic material joined by means which are of substantially less dimension and greater flexibility than the said solids thereby providing substantial flexibility in the joining means as compared to said solids and so that one layer of a strip contacts another layer only at the solids, comprising flexing the joining means in conforming the said strip about an injured member; positioning said solids with surface portions of adjacent solids only contacting, thereby providing air spaces between solids of the strip; and adhesively securing said contacting surface portions only of said solids together thereby preventing relative movement between solids and forming a rigid and open surgical structure.

2. The method of forming a surgical cast or splint from a strip composed of a multiplicity of discrete geometric solids in the shape of flattened solids, as substantially discs, and formed of a plastic material joined by means which are of substantially less dimension and greater flexibility than the said solids thereby providing substantial flexibility in the joining means as compared to said solids and so that one layer of a strip contacts another layer only at the solids, comprising flexing the joining means in conforming the said strip about an injured member; positioning said solids with surface portions of adjacent solids only contacting, thereby providing air spaces between solids of the strip; and adhesively securing said contacting surface portions only of said solids together thereby preventing relative movement between solids and forming a rigid and open surgical structure.

3. The method of forming a surgical cast or splint from a strip composed of a multiplicity of discrete geometric solids in the shape of solids having a curved surface, as substantially half spheres, and formed of a plastic material joined by means which are of substantially less dimension and greater flexibility than the said solids thereby providing substantial flexibility in the joining means as compared to said solids and so that one layer of a strip contacts another layer only at the solids, comprising flexing the joining means in conforming the said strip about an injured member; positioning said solids with surface portions of adjacent solids only contacting, thereby providing air spaces between solids of the strip; and adhesively securing said contacting surface portions only of said solids together thereby preventing relative movement between solids and forming a rigid and open surgical structure.

4. The method of forming a surgical cast or splint from a strip composed of a multiplicity of discrete geometric solids in the shape of tapered solids, as substantially truncated cones, and formed of a plastic material joined by means which are of substantially less dimension and greater flexibility than the said solids thereby providing substantial flexibility in the joining means as compared to said solids and so that one layer of a strip contacts another layer only at the solids, comprising flexing the joining means in conforming the said strip about an injured member; positioning said solids with surface portions of adjacent solids only contacting, thereby providing air spaces between solids of the strip; and adhesively securing said contacting surface portions only of said solids together thereby preventing relative movement between solids and forming a rigid and open surgical structure.

5. A surgical cast or splint formed of a multiplicity of dry and discrete geometrical solids of a plastic material which have been joined by connecting means of less dimension and greater flexibility than the said solids and thereby conformed about an injured member with one layer of a strip contacting another layer only at the solids, thereby providing air spaces between solids and providing contacting surface portions between adjacent solids and which solids have been adhesively secured at said contacting portions preventing relative movement between solids and thereby formed into a rigid structure.

6. A surgical cast or splint formed of a multiplicity of dry and discrete geometrical solids in the shape of flattened solids, as substantially discs, and formed of a plastic material which have been joined by connecting means of less dimension and greater flexibility than the said solids and thereby conformed about an injured member with one layer of a strip contacting another layer only at the solids, thereby providing air spaces between solids and providing contacting surface portions between adjacent solids and which solids have been adhesively secured at said contacting portions preventing relative movement between solids and thereby formed into a rigid structure.

7. A surgical cast or splint formed of a multiplicity of dry and discrete geometrical solids in the shape of solids having a curved surface, as substantially half spheres, and formed of a plastic material which have been joined by connecting means of less dimension and greater flexibility than the said solids and thereby conformed about an injured member with one layer of a strip contacting another layer only at the solids, thereby providing air spaces between solids and providing contacting surface portions between adjacent solids and which solids have been adhesively secured at said contacting portions preventing relative movement between solids and thereby formed into a rigid structure.

8. A surgical cast or splint formed of a multiplicity of dry and discrete geometrical solids in the shape of tapered solids, as substantially truncated cones, and formed of a plastic material which have been joined by connecting means of less dimension and greater flexibility than the said solids and thereby conformed about an injured member with one layer of a strip contacting another layer only at the solids, thereby providing air spaces between solids and providing contacting surface portions between adjacent solids and which solids have been adhesively secured at said contacting portions preventing relative movement between solids and thereby formed into a rigid structure.

9. A surgical cast or splint material ready for application, comprising a multiplicity of dry, discrete, and geometric solids of a plastic material; and relatively flexible means, of less diameter and greater flexibility than said solids, joining said solids to form a strip, whereby said strip may be conformed about an injured member with one layer of a strip contacting another layer only at the solids, thereby providing air spaces between solids and providing solids having contacting surface portions which may be adhered together to prevent relative movement of said solids and form a rigid structure.

10. A surgical cast or splint material ready for application, comprising a multiplicity of dry, discrete, and geometric solids in the shape of flattened solids, as substantially discs, and formed of a plastic material; and relatively flexible means, of less diameter and greater flexibility than said solids, joining said solids to form a strip, whereby said strip may be conformed about an injured member with one layer of a strip contacting another layer only at the solids, thereby providing air spaces between solids and providing solids having contacting surface portions which may be adhered together to prevent relative movement of said solids and form a rigid structure.

11. A surgical cast or splint material ready for application, comprising a multiplicity of dry, discrete, and geometric solids in the shape of solids having a curved surface, as substantially half spheres, and formed of a plastic material; and relatively flexible means, of less diameter and greater flexibility than said solids, joining said solids to form a strip, whereby said strip may be conformed about an injured member with one layer of a strip contacting another layer only at the solids, thereby providing air spaces between solids and providing solids having contacting surface portions which may be adhered together to prevent relative movement of said solids and form a rigid structure.

12. A surgical cast or splint material ready for application, comprising a multiplicity of dry, discrete, and geometric solids in the shape of tapered solids, as substantially truncated cones, and formed of a plastic material; and relatively flexible means, of less diameter and greater flexibility than said solids, joining said solids to form a strip, whereby said strip may be conformed about an injured member with one layer of a strip contacting another layer only at the solids, thereby providing air spaces between solids and providing solids having contacting surface portions which may be adhered together to prevent relative movement of said solids and form a rigid structure.

13. The method of forming a surgical cast or splint from a strip composed of a multiplicity of discrete geometric solids having a minimum thickness of one thirty-second of an inch and formed of a plastic material joined by means which are of substantial flexibility as compared to the said solids thereby providing substantial flexibility in the joining means as compared to said solids, comprising flexing the joining means in conforming the said strip about an injured member; positioning said solids with surface portions of adjacent solids contacting and with air spaces between said solids; and adhesively securing said contacting surface portions of said solids together thereby preventing relative movement between solids and forming a rigid surgical structure.

14. A surgical cast or splint formed of a multiplicity of dry and discrete geometrical solids having a minimum thickness of one thirty-second of an inch and formed of a plastic material which have been joined by connecting means of substantial flexibility as compared to said solids and thereby conformed about an injured member with contacting surface portions between adjacent solids and air spaces between solids and which solids have been adhesively secured at said contacting portions preventing relative movement between solids and thereby formed into a rigid structure.

15. A surgical cast or splint material ready for application comprising a multiplicity of dry, discrete, and geometric solids having a minimum thickness of one thirty-second of an inch and formed of a plastic material; and relatively flexible means, as compared to said solids, joining said solids to form a strip, whereby said strip may be conformed about an injured member with said solids having surface portions contacting and open spaces between solids to form a cast or splint by flexing said flexible means and the contacting portions of the solids may be adhered together to prevent relative movement of said solids and form a rigid structure.

16. The method of forming a surgical cast or splint from a strip composed of a multiplicity of discrete geometric solids of a plastic material joined by means which are of substantial flexibility as compared to the said solids thereby providing substantial flexibility in the joining means as compared to said solids, comprising flexing the joining means in conforming the said strip about an injured member; positioning said solids with surface portions of adjacent solids contacting and with air spaces between said solids; and adhesively securing said contacting surface portions of said solids together thereby preventing relative movement between solids and forming a rigid surgical structure.

17. The method of forming a surgical cast or splint from a strip composed of a multiplicity of discrete geometric solids in the shape of flattened solids, as substantially discs, and formed of a plastic material joined by means which are of substantial flexibility as compared to the said solids thereby providing substantial flexibility in the joining means as compared to said solids, comprising flexing the joining means in conforming the said strip about an injured member; positioning said solids with surface portions of adjacent solids contacting and with air spaces between said solids; and adhesively securing said contacting surface portions of said solids together thereby preventing relative movement between solids and forming a rigid surgical structure.

18. The method of forming a surgical cast or splint from a strip composed of a multiplicity of discrete geometric solids in the shape of solids having a curved surface, as substantially half spheres, and formed of a plastic material joined by means which are of substantial flexibility as compared to the said solids thereby providing substantial flexibility in the joining means as compared to said solids, comprising flexing the joining means in conforming the said strip about an injured member; positioning said solids with surface portions of adjacent solids contacting and with air spaces between said solids; and adhesively securing said contacting surface portions of said solids together thereby preventing relative movement between solids and forming a rigid surgical structure.

19. The method of forming a surgical cast or splint from a strip composed of a multiplicity of discrete geometric solids in the shape of tapered solids, as substantially truncated cones, and formed of a plastic material joined by means which are of substantial flexibility as compared to the said solids thereby providing substantial flexibility in the joining means as compared to said solids, comprising flexing the joining means in conforming the said strip about an injured member; positioning said solids with surface portions of adjacent solids contacting and with air spaces between said solids; and adhesively securing said contacting surface portions of said solids together thereby preventing relative movement between solids and forming a rigid surgical structure.

20. A surgical cast or splint formed of a multiplicity of dry and discrete geometrical solids of a plastic material which have been joined by connecting means of substantial flexibility as compared to said solids and thereby conformed about an injured member with contacting surface portions between adjacent solids and air spaces between solids and which solids have been adhesively secured at said contacting portions preventing relative movement between solids and thereby formed into a rigid structure.

21. A surgical cast or splint formed of a multiplicity of dry and discrete geometrical solids in the shape of flattened solids, as substantially discs, and formed of a plastic material which have been joined by connecting means of substantial flexibility as compared to said solids and thereby conformed about an injured member with contacting surface portions between adjacent solids and air spaces between solids and which solids have been adhesively secured at said contacting portions preventing relative movement between solids and thereby formed into a rigid structure.

22. A surgical cast or splint formed of a multiplicity of dry and discrete geometrical solids in the shape of solids having a curved surface, as substantially half spheres, and formed of a plastic material which have been joined by connecting means of substantial flexibility as compared to said solids and thereby conformed about an injured member with contacting surface portions between adjacent solids and air spaces between solids and which solids have been adhesively secured at said contacting portions preventing relative movement between solids and thereby formed into a rigid structure.

23. A surgical cast or splint formed of a multiplicity of dry and discrete geometrical solids in the shape of tapered solids, as substantially truncated cones, and formed of a plastic material which have been joined by connecting means of substantial flexibility as compared to said solids and thereby conformed about an injured member with contacting surface portions between adjacent solids and air spaces between solids and which solids have been adhesively secured at said contacting portions preventing relative movement between solids and thereby formed into a rigid structure.

24. A surgical cast or splint material ready for application comprising a multiplicity of dry, discrete, and geometric solids in the shape of solids having a curved surface, as substantially half spheres, and formed of a plastic material; and relatively flexible means, as compared to said solids, joining said solids to form a strip, whereby said strip may be conformed about an injured member with said solids having surface portions contacting and open spaces between solids to form a cast or splint by flexing said flexible means and the contacting portions of the solids may be adhered together to prevent relative movement of said solids and form a rigid structure.

25. A surgical cast or splint material ready for application comprising a multiplicity of dry, discrete, and geometric solids in the shape of tapered solids, as substantially truncated cones, and formed of a plastic material; and relatively flexible means, as compared to said solids, joining said solids to form a strip, whereby said strip may be conformed about an injured member with said solids having surface portions contacting and open spaces between solids to form a cast or splint by flexing said flexible means and the contacting portions of the solids may be adhered together to prevent relative movement of said solids and form a rigid structure.

26. A surgical cast or splint material ready for application comprising a multiplicity of dry, discrete, and geometric solids of a plastic material; and relatively flexible means, as compared to said solids, joining said solids to form a strip, whereby said strip may be conformed about an injured member with said solids having surface portions contacting and open spaces between solids to form a cast or splint by flexing said flexible means and the contacting portions of the solids upon adherence together by the use of a solvent containing solution will prevent relative movement of said solids and form a rigid structure.

27. A surgical cast or splint material ready for application comprising a multiplicity of dry, discrete, and geometric solids in the shape of flattened solids, as substantially discs, and formed of a plastic material; and relatively flexible means, as compared to said solids, joining said solids to form a strip, whereby said strip may be conformed about an injured member with said solids having surface portions contacting and open spaces between solids to form a cast or splint by flexing said flexible means and the contacting portions of the solids upon adherence together by use of a solvent containing solution will prevent relative movement of said solids and form a rigid structure.

ROGER ANDERSON.